US006740872B1

(12) United States Patent
Holle

(10) Patent No.: US 6,740,872 B1
(45) Date of Patent: May 25, 2004

(54) SPACE-ANGLE FOCUSING REFLECTOR FOR TIME-OF-FLIGHT MASS SPECTROMETERS

(75) Inventor: Armin Holle, Oyten (DE)

(73) Assignee: Brukder Daltonik GmbH, Bremen (DE)

( * ) Notice: Subject to any disclaimer, the term of this patent is extended or adjusted under 35 U.S.C. 154(b) by 0 days.

(21) Appl. No.: 10/298,169

(22) Filed: Nov. 15, 2002

(30) Foreign Application Priority Data

Nov. 17, 2002 (DE) ........................................ 101 56 604

(51) Int. Cl.[7] ......................... B01D 59/44; H01J 49/40; H01J 49/06; H01J 49/22

(52) U.S. Cl. ....................... 250/281; 250/282; 250/286; 250/287

(58) Field of Search ................................ 250/281, 282, 250/286, 287

(56) References Cited

U.S. PATENT DOCUMENTS

| | | | | | |
|---|---|---|---|---|---|
| 4,072,862 | A | * | 2/1978 | Mamyrin et al. | 250/286 |
| 4,731,532 | A | * | 3/1988 | Frey et al. | 250/287 |
| 5,065,018 | A | * | 11/1991 | Bechtold et al. | 250/287 |
| 5,160,840 | A | | 11/1992 | Vestal | |
| 5,654,544 | A | * | 8/1997 | Dresch | 250/287 |
| 5,847,385 | A | * | 12/1998 | Dresch | 250/287 |
| 5,869,829 | A | * | 2/1999 | Dresch | 250/287 |
| 6,011,259 | A | * | 1/2000 | Whitehouse et al. | 250/287 |
| 6,518,569 | B1 | * | 2/2003 | Zhang et al. | 250/287 |
| 6,570,152 | B1 | * | 5/2003 | Hoyes | 250/287 |
| 2002/0092980 | A1 | * | 7/2002 | Park | 250/288 |

FOREIGN PATENT DOCUMENTS

| | | |
|---|---|---|
| DE | 3726952 A1 | 2/1989 |
| EP | 0 704 879 A1 | 4/1996 |
| GB | 2 274 197 A | 7/1994 |

* cited by examiner

*Primary Examiner*—John R. Lee
*Assistant Examiner*—Bernard E. Snow

(57) ABSTRACT

The invention relates to an energy-focusing and space-angle focusing reflector for time-of-flight mass spectrometers. The invention consists in producing an adjustable space-angle focusing system by means of an adjustably weaker field with curved equipotential lines at the end of the reflector instead of a fully homogeneous electrical reflection field.

9 Claims, 3 Drawing Sheets

SPACE-ANGLE FOCUSING REFLECTOR FOR TIME-OF-FLIGHT MASS SPECTROMETERS

FIELD OF INVENTION

The invention relates to an energy-focusing and space-angle focusing reflector for time-of-flight mass spectrometers.

BACKGROUND OF THE INVENTION

Two-stage reflectors with grids are known from the work of B. A. Mamyrin, V. I. Karatzev and D. V. Shmikk (U.S. Pat. No. 4,072,862). These allow ions to be reflected with velocity focusing with an adjustable focal length (see FIG. 1). An initial, strong opposing field decelerates the ions while a second, well homogenized field reflects the ions to produce the velocity focusing. The focal length of the energy focusing can be adjusted by adjusting the field-strength ratio of the deceleration and reflection field. This reflector does not produce space-angle focusing.

Instead of two-stage reflectors, single-stage reflectors with only one grid in the input area can be used; these have a fixed, relatively short focal length for energy focusing and take up a large proportion of the total flight path of the time-of-flight mass spectrometer.

The work of R. Frey and E. W. Schlag (EP 0 208 894, U.S. Pat. No. 4,731,532) discloses grid-free, two-stage reflectors which provide space-angle focusing as well as a velocity focusing (FIG. 2). The space-angle focusing is produced by the grid-free deceleration field, which acts like an ion lens. However, the focal lengths of the velocity focusing and the space-angle focusing cannot be adjusted independently from each other; only a certain geometric arrangement is able to form an image on an ion detector from a slightly divergent ion beam emerging from a single source which is both velocity focused and space-angle focused.

The grid-free reflector is assembled from a number of metallic annular electrodes and a terminating electrode. The terminating electrode is usually in the form of a grid so that the spectrometer can also be operated in non-reflecting, linear mode with an ion detector placed behind the terminating electrode. The first two annular electrodes can have a relatively small internal diameter. A strong deceleration field is set up between them by applying a high potential difference. The equipotential lines which emerge from the space between, and pass through, the electrode apertures form the space-angle focusing ion lens. The other annular electrodes have the same internal diameter, the same distances between them and the same potential differences. They form a homogeneous reflection field which provides the energy focusing for ions of different energies due to the different penetration depths (and therefore different flight paths). The focal length of the energy focus is adjusted by the ratio of the field strengths in the deceleration and the reflection field—as with the grid reflector. The focus adjustment of the space-angle focusing, the focal length of which is not normally the same as that of the energy focusing, is therefore permanently coupled.

SUMMARY OF THE INVENTION

The invention consists in producing a weaker electrical field strength in the final section of the reflector field component. This creates the conditions for a field penetration of the somewhat stronger fields of the previous sections into the region of the weaker field and, due to the field penetration, slightly curved equipotential surfaces in the area of the last annular electrode. If the ions which are injected into this region are now brought to a stop before they are accelerated in the opposite direction, they are slightly deflected by the curved potential surfaces as they are reflected. Marginal beams which do not pass along the axis are deflected toward the axis and are therefore space-angle focused. The degree of deflection, and therefore the focal length of the space-angle focusing, can be adjusted by the degree to which the equipotential surfaces are curved. If the degree to which the equipotential surfaces are curved is predetermined and fixed, then the focal length of the space angle focusing can be adjusted by the total voltage at the reflector, i.e. by the penetration depth of the ions into the area of the increasingly curved equipotential surfaces.

The weaker field in the final section can be produced by lower potential differences with the same distance between the electrodes, by a larger distance between the last annular electrode and the terminating electrode at the same potential difference, by a combination of the two or by a dented terminating electrode. The dented terminating electrode pulls the curved equipotential surfaces as far as the terminating electrode. The dent does not have to be curved, a simple recess is sufficient.

The invention can be used in both single-stage and two-stage reflectors, with or without grids in each case.

PREFERRED EMBODIMENTS

Figure 4:
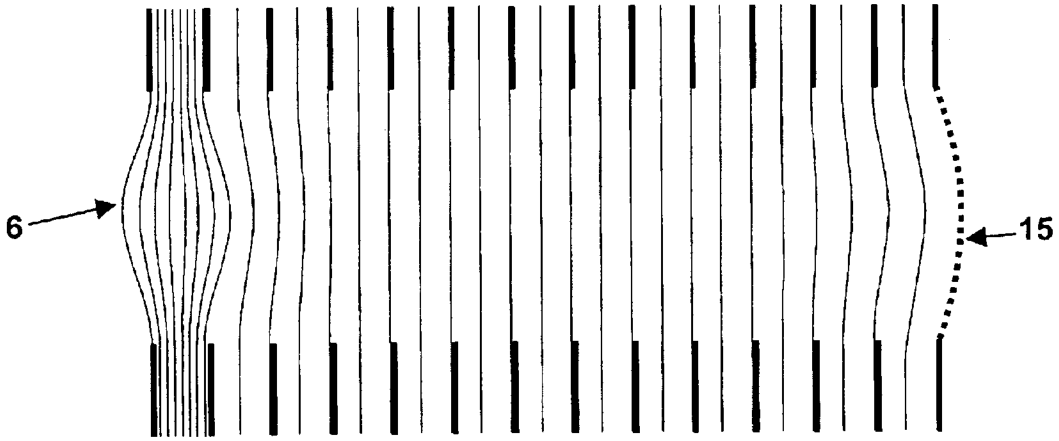
FIG. 4 shows another embodiment. In this case, the terminating electrode is dented to produce curved equipotential surfaces for the space-angle focusing. These support the space-angle focusing of the ion lens at the input.
Figure 5:
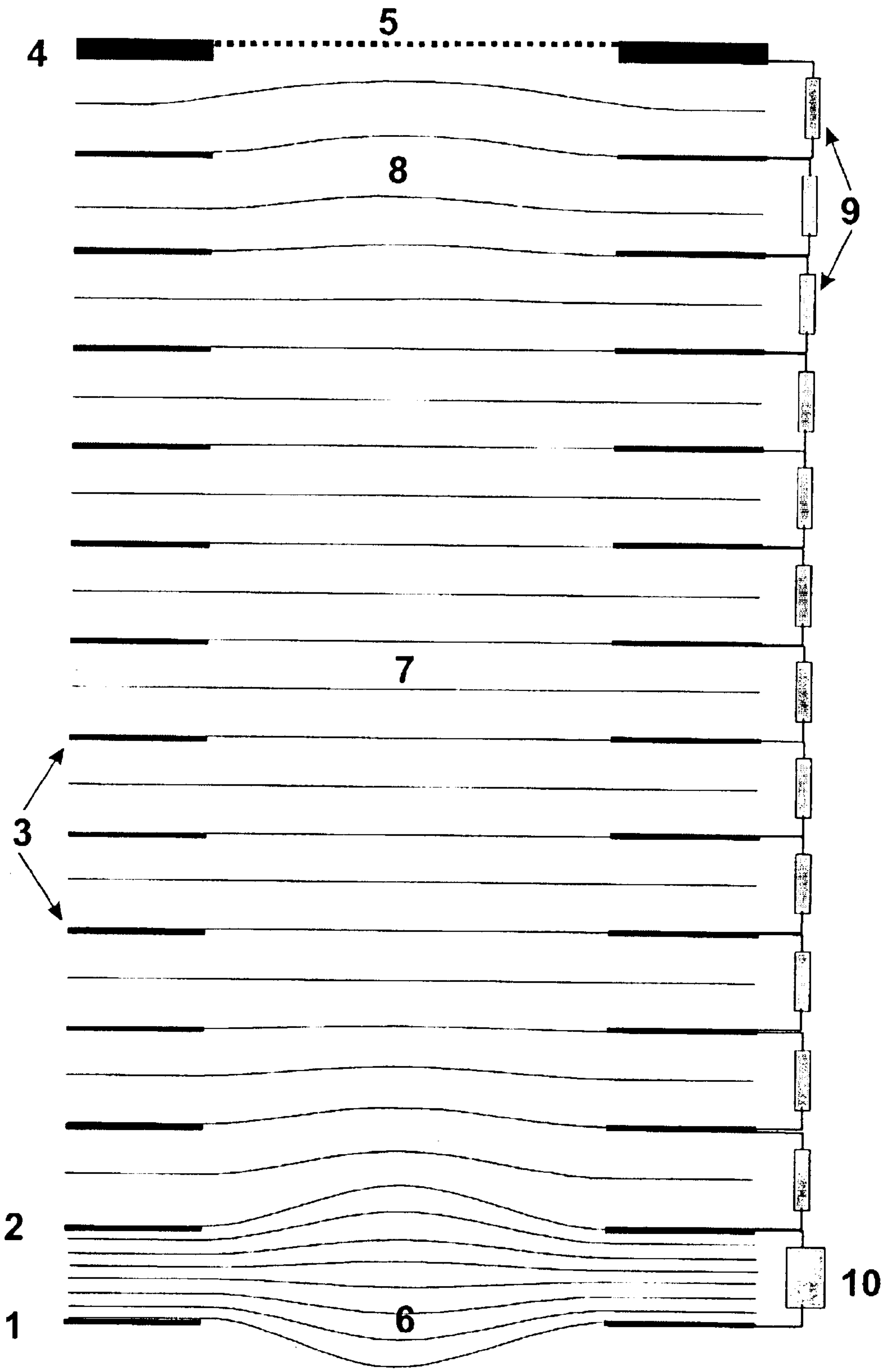
FIG. 5 shows an embodiment of this invention which is particularly inexpensive to build and therefore particularly preferred.

FIG. 5 shows an embodiment of this invention which is particularly inexpensive to build and therefore particularly preferred. The curvature of the equipotential surfaces in the area of the terminating electrode appears exaggerated in each of FIGS. 3, 4 and 5 in order make the effect clear. In reality, however, these curvatures are significantly less so as to prevent over-focusing.

Figure 1:
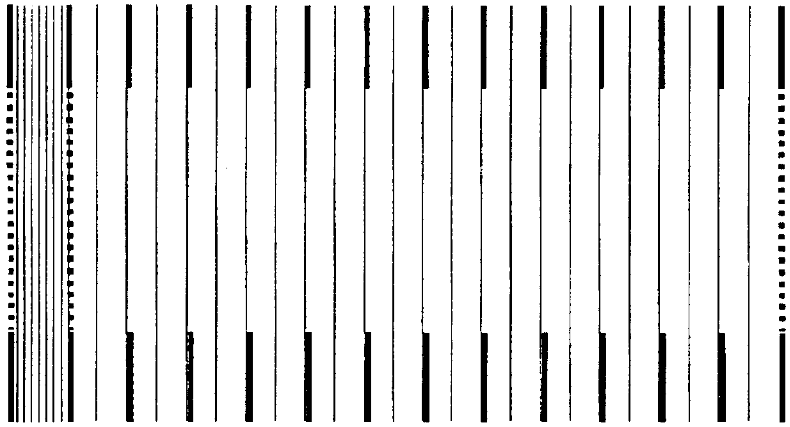
FIGURE 1 (PRIOR ART)
FIG. 1 shows a two-stage reflector according to Mamyrin et al. with a completely homogeneous, state-of-the-art field.
Figure 2:
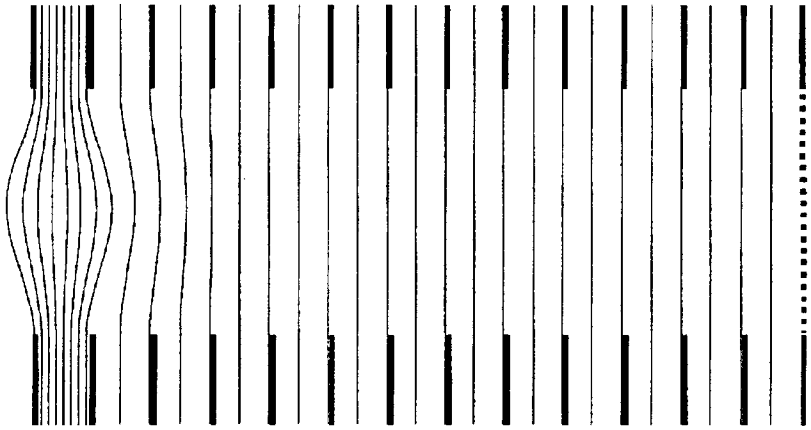
FIGURE 2 (PRIOR ART)
FIG. 2 shows a two-stage reflector according to Frey et al. The lack of a grid in the input area has the effect of forming an ion lens.

In FIG. 5, between the deceleration fields (1) and (2), a high deceleration field is formed by a high potential divider resistance (10). This deceleration field creates a lens-shaped arrangement (6) of the equipotential surfaces (as already shown in FIGS. 2 and 4) due to the field penetration into the neighboring compartments on both sides. The effect of the lens is relatively weak since the energy of the ions when passing through the lens is relatively high and the ion paths are therefore very “rigid”. Because the potential divider resistances (9) are the same, the eleven annular electrodes (3) form a homogeneous field (7) with equipotential surfaces which are only slightly curved by field penetration on reaching the area (8) of the last annular electrodes. The field penetration is produced by the fact that the grid (5) of the terminating electrode (4) has not been attached in the front plane of the terminating electrode but on the rear of the intentionally thick electrode so that the grid forms a recess adjacent to the front of the terminating electrode (4). This recess weakens the field in the last section and has the effect of curving the equipotential surfaces. The inexpensive manufacture of the embodiment is due to the fact that a flat grid being used in a somewhat thicker terminating electrode rather than a dented grid such as the one shown in FIG. 4, which is difficult to reproduce. In this case, all the annular electrodes are equidistant from each other, which means that the same insulated distance pieces can be used for the retaining elements (not shown) for the electrodes. The resistances (9) for the potential divider, except the resistance (10) for the first deceleration field, are also identical. These resistances have to be made to close tolerances; using identical resistances for all the electrodes of the reflector field make manufacture easier. The input electrode (1) is at base potential but an adjustable, high reflection potential is applied to the terminating electrode. Slight changes to this potential will alter the penetration depth of the ions in the area (8) and therefore the curvature of the equipotential surfaces at the point where the ions are reversed; therefore the focal length of the space-angle focusing can be adjusted by this potential at the terminating electrode.

This embodiment of an energy-focusing reflector is particularly easy to manufacture. All the distances between the electrodes, including the terminating electrode, are the same and therefore during assembly, when the distances are produced using ceramic insulators which are ground precisely to size, they can be set up simply and without the risk of confusing one with another. The resistances which are used for the potential divider are also identical except for the resistance which is used for the first deceleration potential. Since these resistances must have very close tolerances and are correspondingly expensive, reducing number of different resistances to just two also helps to reduce the cost. The invention in this case is realized simply by the shape of the terminating electrode. This is thicker than the other electrodes and has the metallic grid on the rear instead of the front. The recess causes the field to be weakened in the last section, which leads to the formation of curved equipotential surfaces.

If slightly divergent ion beams are injected into this reflector through the input electrode (1), then their divergence is already somewhat reduced as the beams pass through the input lens, which is formed from the curved equipotential surfaces in the input area (6). However, the effect of this lens is not particularly strong since the ions still have their full energy at this point. Even significant deceleration to about ¼ of their energy (i.e. ½ speed) in this area contributes relatively little to the lens effect. According to the prior art, a very weakly divergent beam becomes practically parallel inside the reflector. If this parallel beam is reflected in the homogeneous part of the reflection field, then it is reflected as a practically parallel beam back to the input lens, where the lens converts it into a weakly convergent beam with a relatively long focal length. Up to this point, this embodiment operates according to the previous state of the art. The focal length cannot be adjusted here.

However, according to this invention, it is also possible to focus a more strongly divergent ion beam adjustably; a more strongly divergent beam entering the reflector still retains residual divergence inside the reflector. If this ion beam is allowed to enter so far that it is not reversed until the curved potential area (8) is reached, then the marginal beams are deflected additionally toward the axis of the reflector. This deflection is significant even when the curvature is weak since here, the ions at some time fully come to rest and therefore only experience the field components toward the axis. In other words, the effect is particularly strong at this point since the ions are travelling very slowly and the energy transfer from the electrical field to the ions is dependent on the duration of the effect. This additional space-angle focusing shortens the focal length.

The focal length of this additional space-angle focusing can be adjusted. To do this, it is only necessary to change the total voltage slightly at the reflector. The ion beam then penetrates a little more or a little less into the area (8) of the increasingly curved equipotential surfaces, and therefore meets more or less curved equipotential surfaces at the point of reversal and experiences greater or less deflection.

If the lens in the input area (6) is made relatively weak by altering the construction, for example by altering the distance between the electrodes (1) and (2), the internal diameter of these electrodes and the deceleration voltage, then it is possible to scan across the desired focal lengths in another range using the focusing effect in the area (8) according to the invention. Reflectors with the same distances between electrodes of the same inner diameters have a very weak lens effects in the input area.

If the lens in the input area of the reflector is very strong, then it is also possible to adjust the focal length for the space-angle focusing by increasing the field in front of the terminating electrode and scattering the reflection in this area. However, it is difficult to make the lens in the input area strong enough for a given deceleration field. This method of focusing certainly must not be used for reflectors with grids in the input area.

This focus adjustment is used for the space-angle focusing effect in order to image the ion beam, which usually emerges from an ion source of small area, on an ion detector with a relatively small surface area. The smaller the ion detector, the easier the adjustment is across the ion beam. This adjustment is crucial for the resolution which can be achieved.

Another unexpected effect is produced by this type of space-angle focusing: the resolution of the time-of-flight mass spectrometer is improved even more. It appears that the marginal beams have a slightly lower kinetic energy in the axial direction in comparison with that of the ions flying along the axis. This leads to a slight difference in the time of flight for the same penetration depth into the reflector. Since the marginal ions do not have to penetrate as far into the reflector as the axial beams because of the field created according to the invention, the difference in the time of flight is compensated for at this point.

Figure 3:
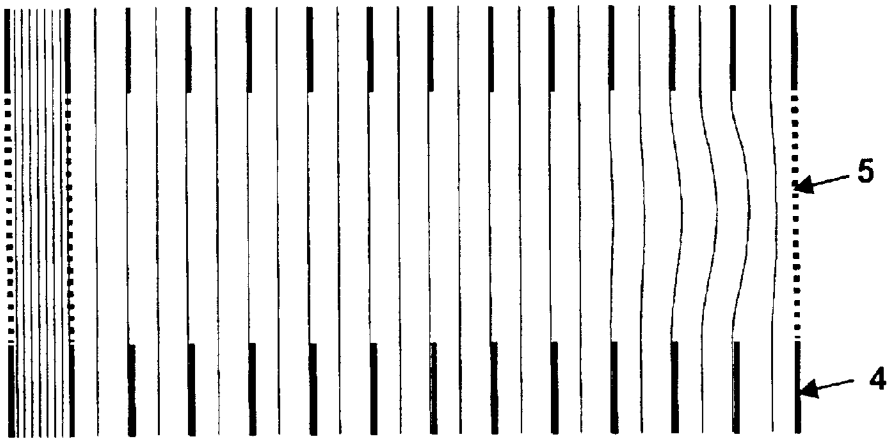
FIG. 3 shows one of many possible embodiments of the invention. In this case, the potential difference in the last section of the reflector is smaller than the previous ones; the field of the previous sections overlaps into the last section and forms curved equipotential surfaces to provide the space-angle focusing.

The mode of operation of the other embodiments according to FIGS. 3 and 4 can be taken from the description of the effect of this preferred embodiment. In the embodiment of FIG. 3, the potential difference in the last section of the reflector is smaller than that of the others. As shown, the field of adjacent sections overlaps into the last section and forms curved equipotential surfaces. This curvature provides space-angle focusing. The lower potential difference in the last section may be formed in the same manner as described above for FIG. 5, that is, by using a relatively thick terminating electrode (4) and a grid (5) attached to its rear surface.

The embodiment of FIG. 4 is also similar to the embodiments of FIGS. 3 and 5 in that it provides a weaker field in the last section. However, in this embodiment, the weaker field is created by a dented terminating electrode (15). The denting must be sufficient to produce a recess, but does not necessarily have to be curved. The recess itself is enough to produce curved equipotential surfaces to support the space-angle focusing of the lens (6) in the input area.

while the invention has been shown and described with regard to preferred embodiments thereof, it will be recognized by those skilled in the art that various changes in form and detail may be made herein without departing from the spirit and scope of the invention as defined by the appended claims.

What is claimed is:

1. Reflector for a time-of-flight mass spectrometer comprising (a) a multitude of annular electrodes and a terminating electrode, (b) voltage divider resistances each between neighboring annular electrodes and between the last annular electrode and the terminating electrode, and (c) a voltage supply for the electrodes of the reflector, building up the potentials necessary at the electrodes for reflecting the ions, wherein the electric field in a rear part of the reflector between the last annular electrode and the terminating electrode is made weaker than the fields between the previous annular electrodes of the reflector.

2. Reflector according to claim 1 wherein annular and terminating electrodes in the rear part of the reflector are equidistant from each other, the potentials between the annular electrodes in this part are produced with fixed division ratios and the potential divider resistance between the last annular electrode and the terminating electrode is variable.

3. Reflector according to claim 1 wherein in the rear part, the annular electrodes of the reflector are equidistant from each other, the potentials between the annular electrodes and the terminating electrode are produced by potential dividers with fixed identical division ratios and the distance between the last annular electrode and the terminating electrode is variable.

4. Reflector according to claim 1 wherein in the rear part of the reflector, the annular electrodes are equidistant from each other, the potentials between the annular electrodes and the terminating electrode are produced by potential dividers with fixed identical division ratios and the distance between the last annular electrode and the terminating electrode is larger than the distance between the annular electrodes.

5. Reflector according to claim 1 wherein in the rear part, the annular electrodes are equidistant from each other, the potentials between the annular electrodes and the terminating electrode are produced by potential dividers with fixed, identical division ratios and the terminating electrode is dented to form a curved field or is provided with a recess of limited area.

6. Reflector according to claim 1 wherein the reflector is provided with a voltage supply with adjustable voltage.

7. Reflector according to claims 1 wherein the reflector is a two-stage reflector and the deceleration field is terminated by a grid on one or both sides.

8. Reflector according to claims 1 wherein the reflector is a two-stage reflector and the deceleration field is formed from annular electrodes without grids.

9. Reflector according to claims 1 wherein the reflector is a single-stage reflector and the reflector has a grid on the input side.

* * * * *